Nov. 7, 1933.  A. DINA  1,933,545
PORTABLE TALKING PICTURE PROJECTOR FOR MOTION PICTURE PROJECTION MACHINES
Filed Feb. 1, 1930
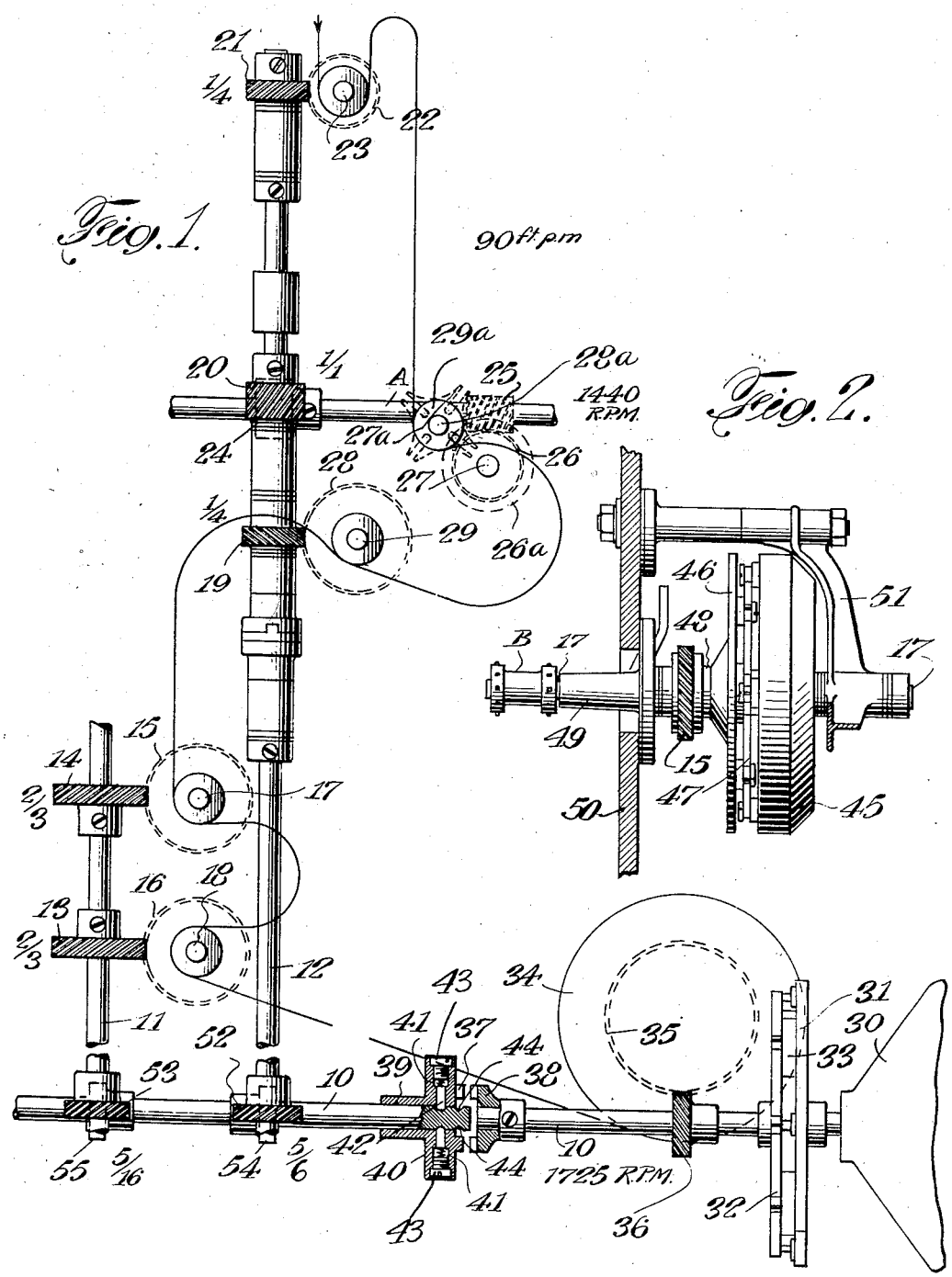

Patented Nov. 7, 1933

1,933,545

UNITED STATES PATENT OFFICE 1,933,545

PORTABLE TALKING PICTURE PROJECTOR FOR MOTION PICTURE PROJECTION MACHINES

Augusto Dina, Elizabeth, N. J., assignor to International Projector Corporation, New York, N. Y., a corporation of Delaware Application February 1, 1930. Serial No. 425,297

11 Claims. (Cl. 88—16.2)

This invention relates to motion picture apparatus and has especial reference to motion picture projectors and more particularly to new and useful improvements in the driving mechanisms therefor.

A main object of the invention is to provide a simple, efficient, compact, and durable driving means for a projector wherein the vibration is reduced practically to zero and many of the strain and power losses ordinarily encountered in the operation of projectors are practically entirely eliminated.

A further object is to provide an improved simple, and efficient driving mechanism for a projector in which the projection of the picture is combined with the driving of mechanism for the production of sound to accompany the projection.

Another object of the invention is to divide the drive mechanism into a plurality of groups or series so that the friction losses are reduced and the ease and quietness and efficiency of operation are enhanced. This improved drive mechanism also includes a novel means of obtaining a very uniform speed of movement of certain elements that are desired to be driven within a very small speed variation.

Further and more specific objects, features, and advantages will more clearly appear from the detailed description given below when taken in connection with the accompanying drawing which forms a part of the specification and which illustrates one present preferred form of the invention.

In motion picture projectors, there are many elements to be driven at various speeds. Heretofore all of these elements have been driven by one drive shaft to which the driven members or elements have been connected by gearing or similar connections. Because of this, it has been found that the drive shafts of these machines were subjected to unnecessary strain and that this undue stress was considerably responsible for the noise of operation and the relatively high power consumption. It has long been a serious problem to reduce the vibrations of the parts, caused, not only by the intermittent motion of some of them, but also by the stresses put upon the driving elements due to overloading of the individual elements thereof.

In the ordinary moving picture projector there are several elements to be driven such as the upper and lower film sprockets, the shutter shaft, intermittent sprocket, and the like. This invention has to do with the idea of dividing or splitting up the drive of these various elements into two or more groups or series through the use of secondary drive shafts driven from a main drive shaft, so that each group of driven elements will be driven by its own secondary drive shaft independent of the elements in the other group or series. It is found that the load on any one secondary drive shaft will not be too great. In this manner the strains above mentioned will be avoided and the noise of operation will also be eliminated.

Furthermore by the use of split drives and secondary shafts the design of the machine will permit the gear or drive ratios to be established so that from the drive shaft to any particular element there will be a uniform change in the speed either up or down. It has been found that if in driving a particular element the speed of the interconnected parts is not uniform and changes widely that there is a strain on the shafts and breakage, and that noisy operation usually results. Therefore in accordance with this invention, when a given element is to be driven, for example, at a speed much lower than the main drive shaft, it is arranged that between the main drive shaft and that element the speed changing devices employed will reduce the speed gradually and uniformly in the downward direction until the desired speed of that element is reached.

These particular desired features, as applied to an ordinary projector, are only magnified when applied to a projector which involves other and more elements to be driven, such as the modern speaking-movie projectors which have the sound reproducing mechanism to be driven in addition to the picture projection apparatus. In these latter machines for instance, it has been found that the two sound sprockets engage the film to feed it generally at absolutely uniform constant speed past the aperture which permits the striations on the film to be translated into sound in one way or another.

In the present invention therefore, the main drive shaft is divided or split into two secondary drive shafts which are properly geared or otherwise connected to and driven from the main motor shaft. Preferably the main shaft is provided with a shock absorber which protects the driven apparatus from sudden and unexpected variations in the main motor speed. There is also provided a simple and efficient clutching mechanism so that the main motor and the lower reel drive may be disconnected from the rest of the apparatus when rewinding is to take place. One of the secondary shafts is called a high speed shaft since it drives those elements in the apparatus which have a higher normal speed than the others. Such elements comprise the upper and lower film sprockets, as in the ordinary projector, the shutter shaft, and the intermittent sprocket. The other secondary shaft is called the low speed shaft and is preferably connected to the two sound sprockets, which are preferably connected thereto by suitable gearing and driven at the same speed which is normally low. One of these sprockets preferably the one which pulls the film down past the sound aperture, is connected to the drive gearing through a flexible specially designed regulator so that its speed is practically uniform and constant regardless of what minor variations may occur in the rest of the apparatus.

Therefore the invention preferably comprises a main drive shaft, a plurality of secondary drive shafts, a shock absorber in the main drive shaft, a clutch therein, and a speed regulator in one of the secondary drive trains to control the speed of predetermined elements therein. In either secondary gear train or shaft, the ratios to any particular element are so designed that as the train extends from the main shaft to that element, the speed of the succeeding portions of the train will either gradually increase or decrease for the reasons above mentioned.

The invention is shown as to its present preferred form in the accompanying drawing, in which, Fig. 1 is a somewhat diagrammatic view of the drive;

Fig. 2 is a partial side elevation of the speed control device.

The present preferred form of the invention as illustrated in the drawing is concerned with a drive mechanism which is to drive the various elements of a speaking-movie projector with a minimum of power loss, a minimum of noise and vibration, and with absolute control of the speed which is so important in such a machine. Altho the invention is shown as applied to such a machine it is clear that it may be applied to any projector or other machines such as cameras in which the objectionable features above outlined are the result of improperly designed elements and arrangements.

In the form illustrated, there are to be driven an upper film sprocket, a lower film sprocket, an intermittent sprocket, a shutter shaft A, a sound sprocket B, and a lower take-up sprocket. The last two are peculiar to the speaking-movie machines whereas the others are found in all projectors and most other motion picture apparatus such as cameras. Ordinarily all of these devices would be driven directly from one shaft, and it is obvious that the load on such a shaft would be heavy with the consequent disadvantages above enumerated and including excess friction due to gear ratios.

The above disadvantages are overcome by splitting up the drive of the elements into a group or series of driven elements operated directly from one or more secondary shafts which are connected to a main drive shaft so that the load on each shaft is less than if the load of the drive were all taken on one shaft. To this end there is provided a main drive shaft 10 connected to two secondary shafts 11 and 12. On the secondary shaft 11 which is the low speed shaft there are disposed gears 13 and 14 connected to gears 15 and 16 on shafts 17 and 18 of the sound sprockets B and the take-up sprocket.

The other secondary shaft 12 which is the so-called high speed shaft, is provided with gears 19, 20, and 21 respectively connected to gears 23, 24, and 22. The gear 21 meshes with gear 22 on the shaft 23 which supports and drives the film sprocket at the top. The gear 20 meshes with the gear 24 on the shutter shaft A. The gear 19 meshes with a gear 28 on the shaft 29 supporting the lower film sprocket. The shutter shaft A has a worm gear 25 meshing with a worm gear 26 on the shaft 27 which carries the usual pin wheel 26a engaging with the star wheel 27a on shaft 28a carrying the intermittent sprocket 29a. This showing is only semi-diagrammatic and other intermittent movements may be used if desired.

The main drive shaft 10 is driven by a motor 30 preferably of the type that has as near a constant speed as possible. Adjacent this motor there is disposed a shock absorber device comprising two plates 31 and 32 with an intervening spring element 33.

This so-called shock absorber will usually sufficiently absorb the variations in speed of the motor due to changes in line voltage or other speed variables which may be developed, and as far as possible keep these variations from being transmitted to the main drive shaft 10.

It is preferred that the lower reel 34 be supported and driven through a gear 35 meshing with a gear 36 on the main drive shaft 10.

Adjacent the motor 30 and between it and the secondary shafts 11 and 12 is disposed a clutch member whereby the drive of these secondary shafts may be stopped when the rewinding of the film is to take place. This clutch device is simple and compact and comprises two clutch members or dogs 37 and 38 one on one portion of the shaft 10 and the other on the adjacent portion of this shaft which naturally is split at this point. The part 37 is formed on a sliding sleeve 39 having a flange portion 40 with oppositely disposed recesses 41 in which are disposed spring pressed pins 42 adjustable by means of set screws 43. These pins press into one or another of a pair of recesses or grooves such as 44 in the portion of the drive shaft 10 to which the sleeve 39 is attached. When the sleeve is manually moved to one position the dogs 37 and 38 engage and the pins are disposed in one pair of recesses or grooves 44 and when the sleeve 39 is moved away from this position the dogs are disengaged and the sleeve is held in this detached position by a similar engagement of the pins with the other pair of grooves 44. Thus the simple efficient clutch member can be operated instantly to permit the rewinding of the film without driving the rest of the mechanism. With this type of clutch, it is found that it cannot be shifted from one position to another while the machine is running. When the machine is not operating the clutch may be opened or closed as the case may be by grasping the knurled circumference and sliding the same in one direction or the other. Preferably the springs are sufficiently compressed to make the movement very difficult when the machine is in operation.

In order to drive the shaft 17 carrying the sound sprocket B at as near absolutely uniform constant speed as possible there is disposed between the sprocket shaft 17 and the driving gear 15 a flexible driving connection which is more particularly shown in Fig. 2. This connection briefly comprises a flywheel 45 on the sprocket shaft 17, an adjacent plate 46 between which and the flywheel 45 is disposed the flexible connection above described in the form of a spring 47. The plate 46 is mounted on the rotatable sleeve 48 which supports the drive gear 15 above mentioned. The drive shaft 17 of the sprocket B is supported at one end in the sleeve 49 supported from the wall 50 of the projector and the bracket 51 also attached to said wall supports it at the other end. This flywheel and flexible connection permits any variation in the drive up to the gear 15 to be absorbed so that practically never does the variation reach the sound sprocket B.

The drive shaft 10 is connected to the two secondary shafts 11 and 12 by means of gears 52 and 53 on the main shaft 10 and co-operating gears 54 and 55 on the respective secondary shafts.

The invention as above stated also concerns that gradual reduction or increase of the speed ratio throughout the machine from the drive shaft to any particular element. To this end it is to be noted, as an example merely, that the speed of the drive shaft may be about 1725 R. P. M., that the ratios between the gears 54 and 52 are about 5 to 6, and about 5 to 16 between the gears 55 and 53. Thus the secondary shaft 12 is driven at a much higher speed than the shaft 11. The ratio between the gears 13 and 16 on the shafts 11 and 18 is about 2 to 3, and the ratio between the gears 14 and 15 is the same so that the shafts 17 and 18 are driven at the same speed. It will be observed in accordance with the above stated general principle that the speed from the main shaft 10 to the shafts 17 and 18 has gradually been slowed down and that in the train mentioned after it has been slowed down it has not been speeded up again in any one train. Thus the strains and consequent disadvantages are avoided.

In the shafts 12 and 29 the ratio between the gears 19 and 28 is about 1 to 4 and the same ratio exists between the gears 21 and 22. The ratio between the gears 20 and 24 is about 1 to 1. It will thus be apparent that the shaft 12 has a much higher speed than the shaft 11 and the shutter shaft A almost as high a speed as the main shaft 10. With all this careful development of the speed ratios it will be observed that the entire system is carefully preserved against excessive friction and the influence of variations in the speed due to outside forces. Some of these benefits are accomplished through the intermediary of the shock absorber near the motor and by the flexible connection adjacent the flywheel 45.

The device is therefore simple and efficient to keep out of the system all extraneous forces and their varying speed effects and excessive friction. Also the device gives the proper speed drive of all elements with the minimum loss of power and strain on the parts thereby resulting in efficient and very quiet running parts, and with a minimum of vibration.

It will be seen that minimum consumption of power is required with this improved driving mechanism, that there are a minimum number of gears employed, and that a proper mechanism is provided for driving those elements of the mechanism which require uniform speed. All of these features are especially adaptable for the speaking-movie work, although the principle of operation may be employed in other machines.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is:

1. A drive mechanism for motion picture apparatus which comprises a main drive shaft, a plurality of secondary drive shafts, one of the secondary shafts being a high speed shaft adapted to drive a shutter shaft and another of the secondary shafts being a low speed shaft adapted to drive a sound mechanism, groups of elements connected to and driven from said secondary shafts, a shock absorber disposed between the drive motor and the secondary shafts, and a flexible speed regulator between one of the secondary shafts and one of the elements driven thereby.

2. A drive mechanism for motion picture apparatus which comprises a main drive shaft, a plurality of secondary drive shafts, one of the secondary shafts being a high speed shaft adapted to drive a shutter shaft and another of the secondary shafts being a low speed shaft adapted to drive a sound mechanism, groups of elements connected to and driven from said secondary shafts, a shock absorber disposed between the drive motor and the secondary shafts, a flexible speed regulator between one of the secondary shafts and one of the elements driven thereby, and a clutch member disposed between the shock absorber and the secondary shafts.

3. A drive mechanism for motion picture apparatus which comprises a main drive shaft, a plurality of secondary speed shafts driven thereby, one of the secondary shafts being a high speed shaft and another being a low speed shaft, a shutter shaft driven by the high speed secondary shaft, a sound mechanism being driven by the low speed shaft, and a flexible connection between the last mentioned secondary shaft and one of the elements of the sound mechanism.

4. A drive mechanism for motion picture apparatus which comprises a main drive shaft, a plurality of secondary speed shafts driven thereby, one of the secondary shafts being a high speed shaft and another being a low speed shaft, a shutter shaft driven by the high speed secondary shaft, a sound mechanism being driven by the low speed secondary shaft, a flexible connection between the last mentioned secondary shaft and one of the elements of the sound mechanism, and a shock absorber between the driving motor and the secondary shafts.

5. A drive mechanism for motion picture apparatus which comprises a main drive shaft, a plurality of secondary drive shafts driven from the main drive shaft, a shutter shaft and film sprockets driven from one of the secondary shafts, a plurality of sound mechanism sprockets driven by another of the secondary shafts, the secondary shaft driving the shutter shaft having a higher speed than the secondary shaft driving the sound mechanism sprockets, the speed changes occurring from the main drive shaft through the secondary shafts to the individual driven elements taking place in a constant speed direction, a shock absorber between the driving motor and the secondary shafts, and a flexible speed regulator between the secondary shaft and the sound mechanism.

6. A drive mechanism for motion picture apparatus having a film take-up, two film sprockets, an intermittent sprocket, and shutter, a sound sprocket and a sound sprocket take-up, which comprises a motor, a main drive shaft connected thereto, a shock absorber between the motor and the main drive shaft, gearing connected to the main drive shaft to drive the film take-up, a secondary drive shaft to drive the two film sprockets and the shutter and the intermittent sprocket, another secondary shaft for driving the sound sprocket and the sound sprocket take-up.

7. A drive mechanism for motion picture apparatus having a film take-up, two film sprockets, an intermittent sprocket, a shutter, a sound sprocket and a sound sprocket take-up, which comprises a motor, a main drive shaft connected thereto, a shock absorber between the motor and the main drive shaft, gearing connected to the main drive shaft to drive the film take-up, a a secondary drive shaft to drive the two film sprockets and the shutter and the intermittent sprocket, another secondary shaft for driving the sound sprocket and the sound sprocket take-up, and a resilient connection between the secondary shaft and the sound sprocket.

8. A drive mechanism for motion picture apparatus having a film take-up, two film sprockets, an intermittent sprocket, a shutter, a sound sprocket and a sound sprocket take-up, which comprises a motor, a main drive shaft connected thereto, a shock absorber between the motor and the main drive shaft, gearing connected to the main drive shaft to drive the film take-up, a secondary drive shaft to drive the two film sprockets and the shutter and the intermittent sprocket, another secondary shaft for driving the sound sprocket and the sound sprocket take-up, and a resilient connection and a flywheel disposed between the secondary shaft and the sound sprocket.

9. A drive mechanism for motion picture apparatus which comprises a horizontally disposed main drive shaft, two vertically disposed secondary drive shafts geared thereto, one of said secondary shafts being a high speed shaft and another of said secondary shafts being a low speed shaft; a horizontally disposed shutter shaft geared to one of said secondary shafts, and a sound device connected to and driven by the other of said secondary shafts, an intermittent mechanism geared to said shutter shaft, a motor driving the main drive shaft, a flexible coupling adjacent said motor in said drive shaft and an adjustable clutch in said drive shaft between said coupling and the secondary shaft.

10. A drive mechanism for motion picture apparatus which comprises a horizontally disposed main drive shaft, a motor for driving the same, a flexible coupling in said shaft adjacent the motor, a film take-up reel geared to said shaft on the opposite side of the coupling from the motor, a pair of vertically disposed secondary shafts geared to the main drive shaft, an adjustable clutch in the main drive shaft between the film take-up reel and the secondary shafts, one of said secondary shafts being geared for high speed and the other of said secondary shafts being geared for low speed, a horizontally disposed shutter shaft geared to the high speed secondary shaft, an intermittent mechanism geared to the shutter shaft, a pair of picture film sprockets geared to the high speed secondary shaft, and a pair of sound film sprockets geared to the low speed secondary shaft.

11. A drive mechanism for motion picture apparatus which comprises a horizontally disposed main drive shaft, a motor for driving the same, a flexible coupling in said shaft adjacent the motor, a film take-up reel geared to said shaft on the opposite side of the coupling from the motor, a pair of vertically disposed secondary shafts geared to the main drive shaft, an adjustable clutch in the main drive shaft between the film take-up reel and the secondary shafts, one of said secondary shafts being geared for high speed and the other of said secondary shafts being geared for low speed, a horizontally disposed shutter shaft geared to the high speed secondary shaft, an intermittent mechanism geared to the shutter shaft, a pair of picture film sprockets geared to the high speed secondary shaft, and a pair of sound film sprockets geared to the low speed secondary shaft, and a flexible coupling and speed regulator mounted in association and cooperating with one of said sound film sprockets.

AUGUSTO DINA.